United States Patent [19]

Festag et al.

[11] 4,403,010
[45] Sep. 6, 1983

[54] METAL-PLASTIC LAMINATE FOIL

[75] Inventors: Werner Festag, Schaffhausen; Hans U. Müller, Löhningen; Hans P. Breitler; Max Bolliger, both of Kreuzlingen, all of Switzerland

[73] Assignee: Swiss Aluminium Ltd., Chippis, Switzerland

[21] Appl. No.: 286,366

[22] Filed: Jul. 23, 1981

[30] Foreign Application Priority Data

Aug. 18, 1980 [CH] Switzerland ............... 6207/80

[51] Int. Cl.³ ............... B32B 3/00; C09J 7/02
[52] U.S. Cl. ............... 428/200; 428/35; 428/209; 428/212; 428/213; 428/347; 428/354; 428/457; 428/458; 428/474.4; 428/910; 428/913
[58] Field of Search ............... 428/458, 200, 469, 354, 428/35, 213, 209, 212, 347, 457, 474.4, 913, 910; 156/196, 331.4

[56] References Cited

U.S. PATENT DOCUMENTS 4,172,914 10/1979 Festag et al. ............... 156/196 X
4,199,389 4/1980 Palfey et al. ............... 156/196

Primary Examiner—Thomas J. Herbert, Jr.
Attorney, Agent, or Firm—Bachman and LaPointe

[57] ABSTRACT

Processes for manufacturing a metal-plastic composite foil having a plastic core covered on both sides with an outer layer of thin metal strip, in particular aluminum thin strip, are already known. However, the use of a so-called triplex composite of the kind just mentioned for relatively large volume containers of full weight up to about 30 kg has been very limited because of the unsatisfactory deep drawing properties of such composites in deep drawing or deep drawing by elongation of the foil (stretching). By means of the invention a process for manufacturing a metal-plastic composite of the so-called triplex composite kind and a metal-plastic composite foil made by this said process have been developed which allow in particular the manufacture of semi-rigid light-weight containers which have a weight of up to about 30 kg when full and this even by cold forming. Containers made from such composite foils are particularly resistant to breakage or leakage and can be closed or fitted together by known sealing methods.

9 Claims, 3 Drawing Figures

METAL-PLASTIC LAMINATE FOIL

BACKGROUND OF THE INVENTION

The invention relates to a process for manufacturing a composite metal-plastic laminated foil, in particular having outer layers made of aluminum thin strip, and also relates to a composite foil manufactured in accordance with the said process.

What is known, for example, is a triple layer metal-plastic composite having a plastic core and metal foil on both sides, and a process according to the U.S. Pat. No. 4,172,914 for manufacturing an aluminum-plastic composite foil. This process features at least one plastic foil adhesively attached to one side of an aluminum foil, this composite being used to manufacture sealable containers for sensitive contents such as foodstuffs, pharmaceuticals, chemicals and the like to provide protection for these contents from the effects of light, oxygen, water vapor, loss of aroma and external aromas.

The process for manufacturing the aluminum (Al)-plastic foil just mentioned is such that an Al-foil is bonded to at least one plastic foil, the elongation at fracture of which is 80–180% and the load bearing capacity of which, when the composite foil is stretched, is greater than that of the Al-foil. The Al is bonded to the plastic foil(s) by an adhesive intermediate layer which exhibits a shear strength of at least 0.3 N/mm$^2$.

Also known is the use of stretched plastic foils such as e.g. biaxial oriented polypropylene foils for the manufacture of two layer Al-plastic laminates. Container parts made from such laminates can, in combination with corresponding laminates of unstretched plastic foils, be sealed to make forms of packaging the seams of which are easily peeled apart so that the packaging can be readily torn open without requiring any aid.

As only relatively soft metal strip is suitable for metal-plastic laminates with good deep drawing properties, such forms of packaging are easily damaged by manipulation during production and in distribution. This problem arises in particular with large volume light-weight containers for fluids in which the outer layers of the metal-plastic composite are made of aluminum thin strip.

To prevent damage to such containers with a weight of up to 30 kg when full, it has been shown to be practical to employ a metal-plastic composite foil which is made up of three layers viz., a so-called triplex composite having a plastic core with thin metal strips on both sides. The use of a triplex composite of the kind just mentioned for relatively large volume containers has, however, been very limited up to now because of the unsatisfactory deep drawing properties of such composite foils in deep drawing or deep drawing by elongation of the foil (stretching). It is therefore an object of the invention to develop a process for manufacturing metal-plastic composite foils and a composite foil in the form of a triplex composite having a plastic core with thin metal strip on both sides wherein the foil can be used in particular for the production of semi-rigid light-weight containers by deep drawing or deep drawing by elongation of the foil (stretching). The said containers are of the kind with a weight of up to about 30 kg when full, are particularly resistant to breakage and leakage and can be closed or fitted together using known sealing methods.

SUMMARY OF THE INVENTION

This object is achieved by way of the invention in the form of a process for manufacturing a metal-plastic composite foil which has a plastic core and metal thin strip as outer layers on both sides, in particular aluminum thin strip, the said process being characterized by the combination of the following features:

(a) the use of a plastically formable, stretched or oriented plastic core which has an elongation at fracture of 40–180%, (b) the use of an adhesive bonding intermediate layer which bonds the plastic core to the metal thin strip and has a shear strength of at least 0.3 N/mm$^2$, (c) the use of pressure and heat to join both layers of metal thin strip to the plastic core, and (d) the choice of ductility of the plastically formable plastic core in a range of 40–180% such that, when the composite is elongated, the load borne by the plastic core is greater than that borne by each of the metal strips.

In a further version of the process the composite foil can be coated, on the side which is later the innermost side of the container, with a thermoplastic, for example a polyamide on a phenolic-epoxy lacquer (1–3 g/m$^2$ dry weight) pre-treated surface, the thermoplastic being deposited by extrusion at or above the melting range. Furthermore, the side of the foil which is the inside of the container can be provided with a thermoplastic foil stuck on with a suitable adhesive, the softening point of the said thermoplastic foil being lower than the softening point of the stretched plastic foil between the two metal thin strips.

The composite foil manufactured by the process is characterized by way of (a) a plastically formable, stretched or oriented plastic core having an elongation at fracture of 40–180%, (b) an adhesively bonding intermediate layer with a shear strength at least 0.3 N/mm$^2$ on both sides of the plastic core, and (c) metal thin strip on top of both layers of adhesive, and such that (d) the two layers of thin metal strip are securely attached to the plastic core layer mentioned in (a) with the aid of the adhesive intermediate layers mentioned in (b).

Further advantageous forms of the process for manufacturing metal-plastic composite foils and exemplified embodiments of the composite foil manufactured in accordance with the said process are revealed in the following specification.

BRIEF DESCRIPTION OF THE DRAWINGS

The drawings show exemplified embodiments of the objects of the invention, presented in a simplified schematic manner viz.

DETAILED DESCRIPTION

Figure 1:
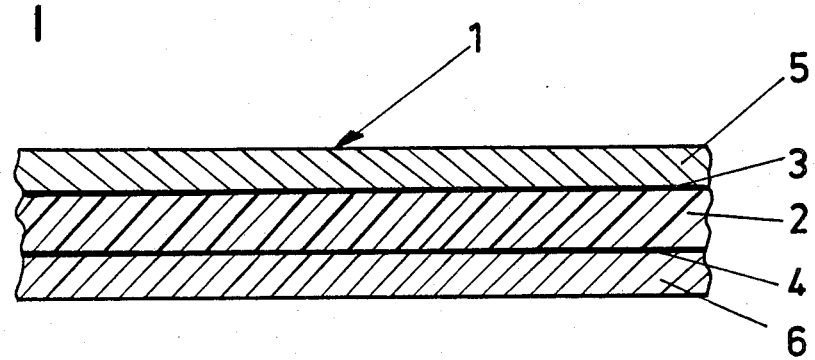
FIG. 1: A composite foil representing a first exemplified embodiment, from which can be seen that the structure is that of a so-called triplex composite.

In the first exemplified embodiment shown in FIG. 1 the metal-plastic composite foil 1 comprises a plastic core 2 with metal strip 5 and 6, for example aluminum thin strip, bonded to each side by means of an adhesive intermediate layer 3 and 4 respectively.

The plastically formable plastic core 2 is for example a polyethylene-terephthalate (PETP), a polybutylene-terephthalate (PBT), a polyamide 6, a polyamide 6.6, a polypropylene or a polycarbonate i.e. a thermoplastic which is in the form of biaxially stretched or oriented foil.

The adhesive forming the intermediate layers 3 and 4 which bond the layers of metal strip 5 and 6 to the plastic core 2 has a shear strength of at least 0.3 N/mm$^2$.

The adhesive can be on the basis of polyester or polyether urethanes, polyurethane epoxy combinations, amine or amino-amide hardened epoxy resins or modified phenolics.

Before laminating it is useful to subject the stretched plastic foil to a conventional corona discharge treatment.

The plastic foil forming the core 2 of the triplex composite 1 has an elongation at fracture in the range of 40-180%. Depending on the thickness and the desired properties of the metal thin strip 5 or 6 used for the composite, the plastic core 2 used is such that, when the composite is deformed, the load borne by the core is greater than that borne by each of the layers of thin metal strip. The total thickness ratio of the two layers of metal 5 and 6 to the plastic core 2 is here 4:1 to 1:1, preferably 2.5:1 to 1.5:1. It should also be mentioned that soft or half-hard aluminum thin strip is particularly well suited for the desired application viz., container manufacture.

Figure 2:
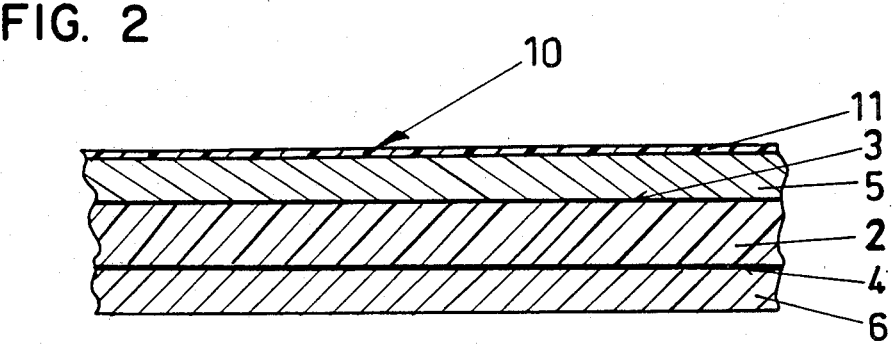
FIG. 2: A composite foil representing a second exemplified embodiment showing a triplex composite with one side coated with a lacquer or a thermoplastic plastic foil.

In the second exemplified embodiment shown in FIG. 2 the metal-plastic composite foil 10 differs from the foil 1 in FIG. 1 essentially in the provision of plastic foil or lacquer 11 on the outside of the metal top layer 5 or 6 which will later face the inside of the container, the foil or lacquer 11 being chosen with regard to the nature or aggressiveness of the contents. With respect to the properties of the plastic foil or lacquer on the surface, it should be noted in particular that this should have a lower softening point than the plastic foil 2 between the layers 5 and 6 of the metal strip so that thermal sealing is possible at temperatures which do not destroy the orientation of the stretched foil.

Instead of a layer 11 of plastic or lacquer a so-called hot melt can be deposited on one side of the composite 10; later this serves to join together container parts made of the composite 10.

Figure 3:
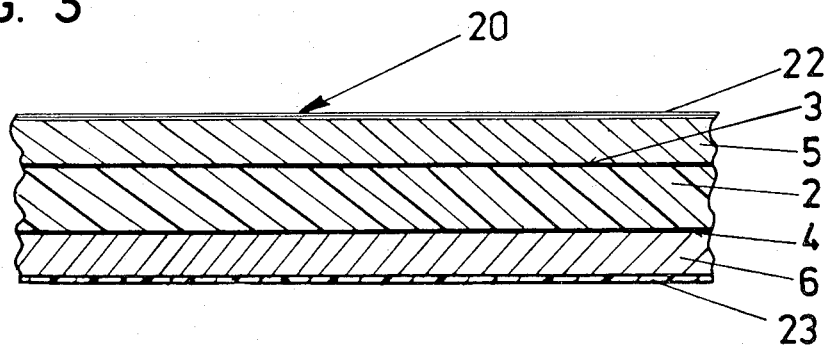
FIG. 3: A composite foil representing a third exemplified embodiment showing a triplex composite with one side coated with lacquer and the other side bearing a plastic foil.

In the third exemplified embodiment shown in FIG. 3 the metal-plastic composite foil 20 differs from the foils 1 and 10 in FIGS. 1 and 2 respectively essentially in the provision of layers 22,23 on both sides of the metal-plastic composite 20 and this such that, on the metal outer layer 6 which is later facing towards the container made from the composite 10, there is a layer 23 of plastic and on the side which is later the outside of the container a layer 22 of lacquer.

The layer 23 of plastic is sealable and can, in a manner not described here, be deposited by extrusion on a metal thin strip 5 or 6 pre-treated with a layer of phenolic epoxy lacquer of dry weight 1-3 g/m$^2$. Such a sealable plastic layer is one made of a polyamide 11 or a polyamide 12 having a thickness of essentially 20-100 μm.

The metal-plastic composite foil according to the invention now provides the advantage of being able to manufacture relatively light, large volume containers with a weight of ca. 30 kg when full and this by a cold forming via deep drawing or deep drawing by elongation of the foil (stretching). Containers manufactured out of such composites are particularly resistant to breakage and leakage and can be closed and fitted together by known sealing methods.

What is claimed is:

1. Metal-plastic composite foil having a plastic core and on both sides of same outer layers of metal thin strip, said composite foil being cold formable by deep drawing or by deep drawing with elongation of the foil into relatively large light-weight containers which have a full weight of up to about 30 kg and can be closed or fitted together by known sealing methods, wherein the composite foil includes a plastically formable, stretched or oriented plastic core having an elongation at fracture of 40-180%, an adhesively bonding intermediate layer with a shear strength of at least 0.3 N/mm$^2$ on both sides of the plastic core, and metal thin strips on top of the adhesive intermediate layers, wherein the two layers of thin metal strip are securely attached to said plastic core layer with the aid of the said adhesive intermediate layers, and wherein the choice of ductility of the plastically formable plastic core is in a range of 40-180% such that, when the composite foil is elongated, the load borne by the plastic core is greater than that borne by each of the layers of thin metal strip.

2. Metal-plastic composite foil according to claim 1 wherein a sealable thermoplastic layer is provided on the metal thin strip and wherein said thermoplastic is a polyamide.

3. Metal-plastic composite foil according to claim 1 wherein the composite foil starting from the flat strip of composite is characterized by the ability to be formed by deep drawing or by deep drawing with elongation of the foil to a container or container part to a ratio diameter: depth of 3:1.

4. Metal-plastic composite foil according to claim 1 wherein the ratio of total thickness of metal strips to that of the plastic core is 4:1 to 1:1.

5. Metal-plastic composite foil according to claim 1 wherein the ratio of total thickness of metal strips to that of the plastic core is 2.5:1 to 1.5:1.

6. Metal-plastic composite foil according to claim 1 wherein the composite foil is coated on one side with a layer of plastic.

7. Metal-plastic composite foil according to claim 6 wherein the foil is coated on the side opposed to said plastic layer with a layer of lacquer.

8. Metal-plastic composite foil according to claim 1 wherein a hot-melt is deposited on one side of the composite foil.

9. Metal-plastic composite foil according to claim 8 wherein the hot-melt is deposited partially on one side of the composite foil.

* * * * *